United States Patent [19]

Bloom et al.

[11] 3,925,060

[45] Dec. 9, 1975

[54] COMPACT CONTAINING IRON OXIDE AND CARBON AND METHOD FOR ITS USE IN STEELMAKING

[75] Inventors: Ray A. Bloom; Herbert L. Phillips, both of N. Canton, Ohio

[73] Assignee: The Timken Company, Canton, Ohio

[22] Filed: Sept. 23, 1974

[21] Appl. No.: 508,170

[52] U.S. Cl. .............................. 75/11; 75/3; 75/12; 75/44 S
[51] Int. Cl.² ...................... C21C 5/52; C22B 1/08
[58] Field of Search .............. 75/11, 12, 3, 44, 44 S

[56] References Cited
UNITED STATES PATENTS

| | | | |
|---|---|---|---|
| 2,995,438 | 8/1961 | Subervie | 75/3 |
| 3,041,161 | 6/1962 | Heinz | 75/3 |
| 3,351,459 | 11/1967 | Mills | 75/3 |
| 3,463,629 | 8/1969 | Hatch | 75/11 |
| 3,807,986 | 4/1974 | Funk | 75/11 |

*Primary Examiner*—Peter D. Rosenberg
*Attorney, Agent, or Firm*—Brown, Murray, Flick & Peckham

[57] ABSTRACT

Mill scale and other similar materials containing iron oxide are recycled by mixing the scale with carbon and a binder, the mixture being formed into compacts of low compressive strength. These are dispersed throughout a scrap charge for an electric arc steelmaking furnace wherein the charge is melted from the bottom up, a substantial part of the melting being by radiation from a molten pool of metal initially formed at the bottom of the furnace. Because of this radiation, the carbon in the compact reacts with the iron oxide to reduce it to iron at a temperature of about 2300°F and before the molten pool ascends to the compact during a melting operation. The invention thus eliminates the need for pre-reduction of the compacts as is necessary in other types of pelletizing or briquetting techniques.

5 Claims, 1 Drawing Figure

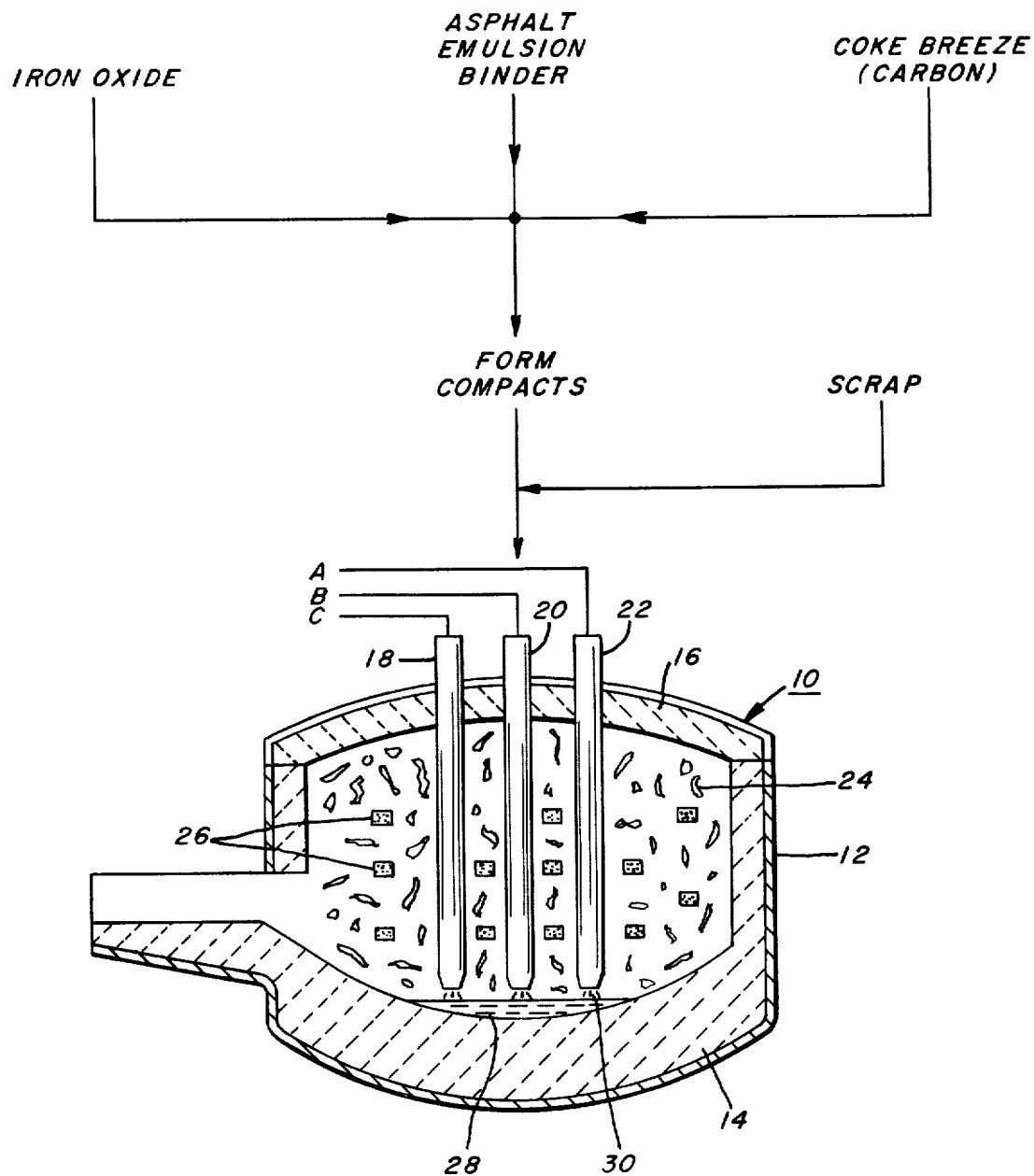

COMPACT CONTAINING IRON OXIDE AND CARBON AND METHOD FOR ITS USE IN STEELMAKING

BACKGROUND OF THE INVENTION

As is known, an electric arc steelmaking furnace consists, essentially, of a refractory-lined vessel having a roof through which electrodes extend. In a typical case, the roof and electrodes are removable to permit scrap to be charged into the furnace through the top. After the scrap is charged, the roof is replaced and the electrodes lowered with electrical current flowing between them. As the electrodes descend, they melt the charge beneath and around them and continue to bore through the charge, forming a pool of molten metal at the bottom of the furnace. After the pool of molten metal is thus formed, the scrap is melted from the bottom up principally by radiation from the pool, by heat from the arc, and by the resistance offered to the current by the scrap. This process is continued until the entire charge is completely melted with the level of the molten pool at the bottom of the furnace ascending as more and more scrap is melted.

In any steelmaking facility, large amounts of iron oxides in the form of mill scale, scarfing slag and hot mill slag are generated. The major component of these materials is $Fe_3O_4$. In the past, such materials have been discarded, notwithstanding the fact that they contain large amounts of iron which theoretically could be recycled. Large quantities of iron oxide cannot be charged directly into an electric steelmaking furnace, for example, since it will alter the carbon content of the bath and will not be completely reduced. In an effort to recover the iron content of mill scale and similar materials for use in electric furnaces, attempts have been made to form iron oxides into pellets which are pre-reduced. However, this direct reduction prior to use requires a high capital investment and results in high operating costs. Self-reducing pellets or briquettes have been devised in the past comprising a mixture of iron oxide and carbon, together with a binder. Prior processes for producing such self-reducing pellets consisted of adding lime and silica to the mixture of iron oxide and carbon and thereafter heating in a steam autoclave. This produces a pellet or compact of high compressive strength which can be used in blast furnace applications and the like where strength is an important consideration. However, the process for producing such compacts is an unnecessarily costly operation for electric furnace steelmaking practice.

Mixtures of scrap fines and small amounts of iron oxide have been formed into briquettes which are intended to be charged directly into a molten metal bath. This is shown, for example, in U.S. Pat. No. 3,807,986 to Funk et al. The briquettes contain a small amount of carbon, about 0.3% to 2% by weight. The briquette, however, is not self-reducing to any great degree; and the iron oxide present is for the purpose of reacting with the carbon in a molten ferrous bath to produce a carbon boil. Such briquettes, therefore, are not satisfactory where reduction of substantial amounts of iron oxide before melting is desired.

SUMMARY OF THE INVENTION

In accordance with the present invention, a new and improved system is provided for recycling mill scale and other similar products in electric steelmaking furnaces and the like. Instead of pre-reducing iron oxides in a separate process, the iron oxide is mixed with a reducing agent, preferably carbon. To this mixture is added a low cost binder which will form air-dried compacts of relatively low compressive strength without the necessity for costly processing procedures as are required, for example, in compacts utilizing hydrated calcium silicate as a binder. The resulting compacts can be dispersed throughout a scrap charge for an electric arc furnace without materially breaking up during the charging process. As a molten pool of metal is formed at the bottom of the furnace during the melting operation, the heat transferred by radiation from that pool and from the electric arcs will cause the carbon within the compacts to react with the iron oxide to reduce it to iron, the reaction being completed at a temperature of about 2300°F, well below the temperature of the molten bath itself. That is, as the level of the molten bath within the furnace rises, the heat of radiation from the pool will initially reduce the iron oxide to iron such that when the level of the molten bath rises to a compact, it is essentially completely reduced to iron.

In the preferred embodiment of the invention, the binder utilized is an asphalt emulsion, hereinafter described in detail, which comprises an emulsion of asphalt particles and soap in an aqueous solution. The binder is essentially the same material as that used as a sealant for asphalt driveways. It is relatively inexpensive; and the compacts using the binder can be air-dried and can be stored at almost any ambient temperature. This is to be contrasted, for example, with ordinary tars and asphalts which become tacky at high ambient temperatures and would, if used as a binder, cause the compacts to stick together in storage.

Typically, about 4 parts iron oxide in the form of mill scale or the like are mixed with 1 part carbon; and to this total mixture is added about 3 to 6 weight percent of an asphalt emulsion binder. After compaction in a brick press or the like, the compacts are air-dried and ready for use.

The above and other objects and features of the invention will become apparent from the following detailed description taken in connection with the accompanying single figure drawing which schematically illustrates the invention.

With reference now to the drawing, a flow diagram of the basic process of the invention is shown wherein iron oxide is mixed with coke breeze (i.e., carbon) and an asphalt emulsion binder to form a blend which is formed into compacts in a brick press or the like. The iron oxide can be in the form of mill scale, scarfing slag, hot mill slag or other similar by-products from a steelmaking facility. It is crushed to produce a mesh size of 35 or smaller, the preferred range being a mesh size of 35 to 60 and down. Preferably, 80% iron oxide is mixed with 20% carbon; however the range can be between 80% to 90% iron oxide and 10% to 20% carbon, preferably in the form of coke breeze. To this mixture is added 3% to 6% of the asphalt emulsion binder.

The binder is preferably an anionic SS–1 asphalt emulsion, the standard designation being AASHO SS–1 emulsion (American Association of State Highway Officials). It is also identified as ASTM M–140 (American Society for Testing and Materials). "SS" indicates slow set. There are also MS (medium set) emulsions; and there are cationic as well as anionic emulsions. Any of these will suffice; however the anionic emulsion is preferred because of its lower cost. As a specific example, an emulsion can be used containing about 64% by weight asphalt as is produced by mixing the asphalt with a soap emulsifier and passing the mixture through a colloidal mill at 200°F to 300°F, followed by diluting with water. The soap coats the particles of the asphalt which are then wet by the water.

The asphalt emulsion, when used as a binder, is air-dried such that the mixture of iron oxide, coke breeze and asphalt binder, after being formed into a compact or briquette in a brick press or other compacting devices, can be air-dried. A typical briquette has the dimensions, 6 × 8 × 1 inches and has a compressive strength of about 500 pounds per square inch.

The compacts thus formed are mixed with a scrap charge and placed in an electric furnace, the furnace being identified generally by the reference numeral 10 in the drawing. It comprises an outer steel shell 12 with an inner refractory lining 14. The furnace is provided with a removable top 16 through which three electrodes 18, 20 and 22 extend, these being adapted for connection to the three phases A, B and C of a three-phase power source, not shown. When the top 16 is removed, a charge of scrap containing the compacts dispersed throughout is charged in the furnace and the top 16 replaced. The scrap is generally identified by the reference numeral 24 in the drawing; and the compacts dispersed throughout the charge are identified by the reference numeral 26. As shown in the drawing, the compacts are more or less evenly dispersed throughout the scrap charge; however it is possible under certain circumstances to place them within the charge in layers, in which case a portion of the scrap charge can be placed in the furnace, a layer of compacts formed over a partial scrap charge, followed by the addition of additional scrap and so on. Alternatively, the compacts can be thrown into the furnace more or less at random as the scrap is being charged. It is preferable that the compacts form 5% to 10% by weight of the total charge weight, including scrap; however up to 20% of the charge weight in the form of compacts can be used with the remaining 80% scrap.

Assuming that the charge of scrap and compacts has been charged in the furnace 10 as shown in the drawing, current is supplied to the three electrodes which are at this time elevated but contact the top of the charge. Current is therefore caused to flow between the electrodes; and as they are lowered from their uppermost positions, they bore through the scrap charge while melting the scrap immediately beneath and around them. Usually, at the bottom of the charge are fine scrap particles which initially from a molten metal pool 28 when the electrodes reach the bottom. Radiation from this pool 28, together with the heat of the arc 30 and resistance to the flow of electrical current through the scrap, melt the scrap from the bottom upwardly until the entire charge is melted.

As the scrap melts, the heat from the pool 28, whose surface level is ascending, will cause the carbon in the compacts 26 to react with the iron oxide therein to reduce it, the reducing action being completed at a temperature of about 2300°F, below the melting point of the scrap. Thus, as the surface of the molten pool 28 rises, successive ones of the compacts 26 will be reduced such that when the surface of the molten pool reaches a specific compact, it will comprise essentially all iron and will not alter the carbon content of the bath.

The present invention thus provides a new and improved method for recycling mill scale and the like wherein the scale is formed into a self-reducing compact utilizing a low cost asphalt emulsion binder characterized in that the compact is self-reducing and will convert into iron prior to the time it is actually melted in an electric furnace. Although the invention has been shown in connection with a certain specific embodiment, it will be readily apparent to those skilled in the art that various changes in form and arrangement of parts may be made to suit requirements without departing from the spirit and scope of the invention.

We claim:

1. A method for melting steel in an electric arc furnace which comprises charging into said furnace scrap having dispersed therein compacts comprising a mixture of essentially entirely unreduced iron oxide, carbon and an air-drying binder, and causing an electrical current to flow between electrodes disposed within the furnace so as to form a molten pool of metal at the bottom of said furnace, the surface level of said pool rising as the scrap melts with the heat from said pool and the electrodes causing said carbon to react with the iron oxide to reduce the same to iron before the surface of the molten pool reaches a compact and melts the same.

2. The method of claim 1 wherein said reaction of carbon with iron oxide to form iron is completed at a temperature of about 2300°F.

3. The method of claim 1 wherein the compacts are essentially evenly distributed throughout said charge.

4. The method of claim 1 wherein said compacts are contained within said charge in layers.

5. The method of claim 1 including the step of initially forming said compacts with a compressive strength of about 500 pounds per square inch.

* * * * *